United States Patent
Bosch et al.

(10) Patent No.: US 10,303,450 B2
(45) Date of Patent: May 28, 2019

(54) SYSTEMS AND METHODS FOR A POLICY-DRIVEN ORCHESTRATION OF DEPLOYMENT OF DISTRIBUTED APPLICATIONS

(71) Applicant: Cisco Technology, Inc., San Jose, CA (US)

(72) Inventors: Peter Bosch, Aalsmeer (NL); Jeffrey Napper, Delft (NL); Alessandro Duminuco, Milan (IT); Michael Francis O'Gorman, Redwood City, CA (US); Sean Chandler, North Scituate, RI (US); Roman Sorokin, Moscow (RU); David Delano Ward, Somerset, WI (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 15/704,904

(22) Filed: Sep. 14, 2017

(65) Prior Publication Data
US 2019/0079744 A1   Mar. 14, 2019

(51) Int. Cl.
| H04L 29/08 | (2006.01) |
| G06F 8/60 | (2018.01) |
| G06F 8/61 | (2018.01) |

(52) U.S. Cl.
CPC ............... *G06F 8/60* (2013.01); *H04L 67/10* (2013.01); *G06F 8/61* (2013.01)

(58) Field of Classification Search
None
See application file for complete search history.

(56) References Cited

U.S. PATENT DOCUMENTS

| 7,035,930 B2* | 4/2006 | Graupner | G06F 9/5088 709/221 |
| 7,689,676 B2* | 3/2010 | Vinberg | G06F 8/61 703/20 |
| 8,620,998 B2* | 12/2013 | Hajost | G06F 8/60 709/203 |
| 9,600,795 B2* | 3/2017 | Demuth | G06Q 10/06 |

(Continued)

OTHER PUBLICATIONS

Sventek, Joseph, "The Distributed Application Architecture," dcs.gla.ac.uk, accessed on Sep. 7, 2017, pp. 1-12.

(Continued)

*Primary Examiner* — Isaac T Tecklu
(74) *Attorney, Agent, or Firm* — Polsinelli PC

(57) ABSTRACT

The present disclosure involves systems and methods for compiling abstract application and associated service models into deployable descriptors under control of a series of policies, maintaining and enforcing dependencies between policies and applications/services, and deploying policies as regularly managed policy applications themselves. In particular, an orchestration system includes one or more policy applications that are executed to apply policies to a deployable application or service in a computing environment. In general, the orchestration system operates to create one or more solution models for execution of an application on one or more computing environments (such as one or more cloud computing environments) based on a received request for deployment.

20 Claims, 8 Drawing Sheets

(56) References Cited

U.S. PATENT DOCUMENTS

| | | | | |
|---|---|---|---|---|
| 2006/0230314 | A1* | 10/2006 | Sanjar | G06F 8/61 |
| | | | | 714/26 |
| 2008/0126406 | A1* | 5/2008 | Endabetla | G06Q 10/06 |
| 2010/0306772 | A1* | 12/2010 | Arnold | G06F 8/36 |
| | | | | 718/1 |
| 2013/0205007 | A1* | 8/2013 | Ayachitula | G06F 11/3442 |
| | | | | 709/224 |
| 2014/0280961 | A1* | 9/2014 | Martinez | H04L 41/5054 |
| | | | | 709/226 |
| 2015/0341240 | A1* | 11/2015 | Iyoob | H04L 43/08 |
| | | | | 709/201 |
| 2016/0381151 | A1* | 12/2016 | Apte | H04L 67/16 |
| | | | | 709/202 |
| 2017/0017505 | A1* | 1/2017 | Bijani | G06F 9/44505 |
| 2017/0060557 | A1* | 3/2017 | Bendelac | G06F 8/60 |
| 2017/0201569 | A1 | 7/2017 | Fu et al. | |
| 2018/0039486 | A1* | 2/2018 | Kulkarni | G06F 8/38 |
| 2018/0196658 | A1* | 7/2018 | Borley | G06F 8/70 |

OTHER PUBLICATIONS

International Search Report and Written Opinion from the International Searching Authority, dated Dec. 21, 2018, 17 pages, for corresponding International Patent Application No. PCT/US2018/051217.

* cited by examiner

SYSTEMS AND METHODS FOR A POLICY-DRIVEN ORCHESTRATION OF DEPLOYMENT OF DISTRIBUTED APPLICATIONS

TECHNICAL FIELD

The present disclosure relates generally to the field of computing, and more specifically, to applying policies to the deployment of distributed applications in various computing environments.

BACKGROUND

Many computing environments or infrastructures provide for shared access to pools of configurable resources (such as compute services, storage, applications, networking devices, etc.) over a communications network. One type of such a computing environment may be referred to as a cloud computing environment. Cloud computing environments allow users, and enterprises, with various computing capabilities to store and process data in either a privately owned cloud or on a publicly available cloud in order to make data accessing mechanisms more efficient and reliable. Through the cloud environments, software applications or services may be distributed across the various cloud resources in a manner that improves the accessibility and use of such applications and services for users of the cloud environments.

When deploying distributed applications, designers and operators of such applications oftentimes need to make many operational decisions: which cloud the application is to be deployed (such as a public cloud versus a private cloud), which cloud management system should be utilized to deploy and manage the application, whether the application is run or executed as a container or a virtual-machine, can the application be operated as a serverless function. In addition, the operator may need to consider regulatory requirements for executing the application, whether the application is to be deployed as part of a test cycle or part of a live deployment, and/or if the application may require more or fewer resources to attain the desired key-performance objectives. These considerations may oftentimes be referred to as policies in the deployment of the distributed application or service in the computing environments.

Consideration of the various policies for the deployment of a distributed application may be a long and complex procedure as the effect of the policies on the application and the computing environment is balanced to ensure a proper deployment. Such balancing of the various policies for the distributed application may, in some instances, be performed by an operator or administrator of cloud environments, an enterprise network, or the application itself. In other instances, an orchestrator system or other management system may be utilized to automatically select services and environments for deployment of an application based on a request. Regardless of the deployment system utilized, application and continuous monitoring of policies associated with a distributed application or service in a cloud computing environment (or other distributed computing environment) may require significant administrator or management resources of the network. Further, many policies for an application may conflict in ways that make the application of the policies difficult and time-consuming for administrator systems.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
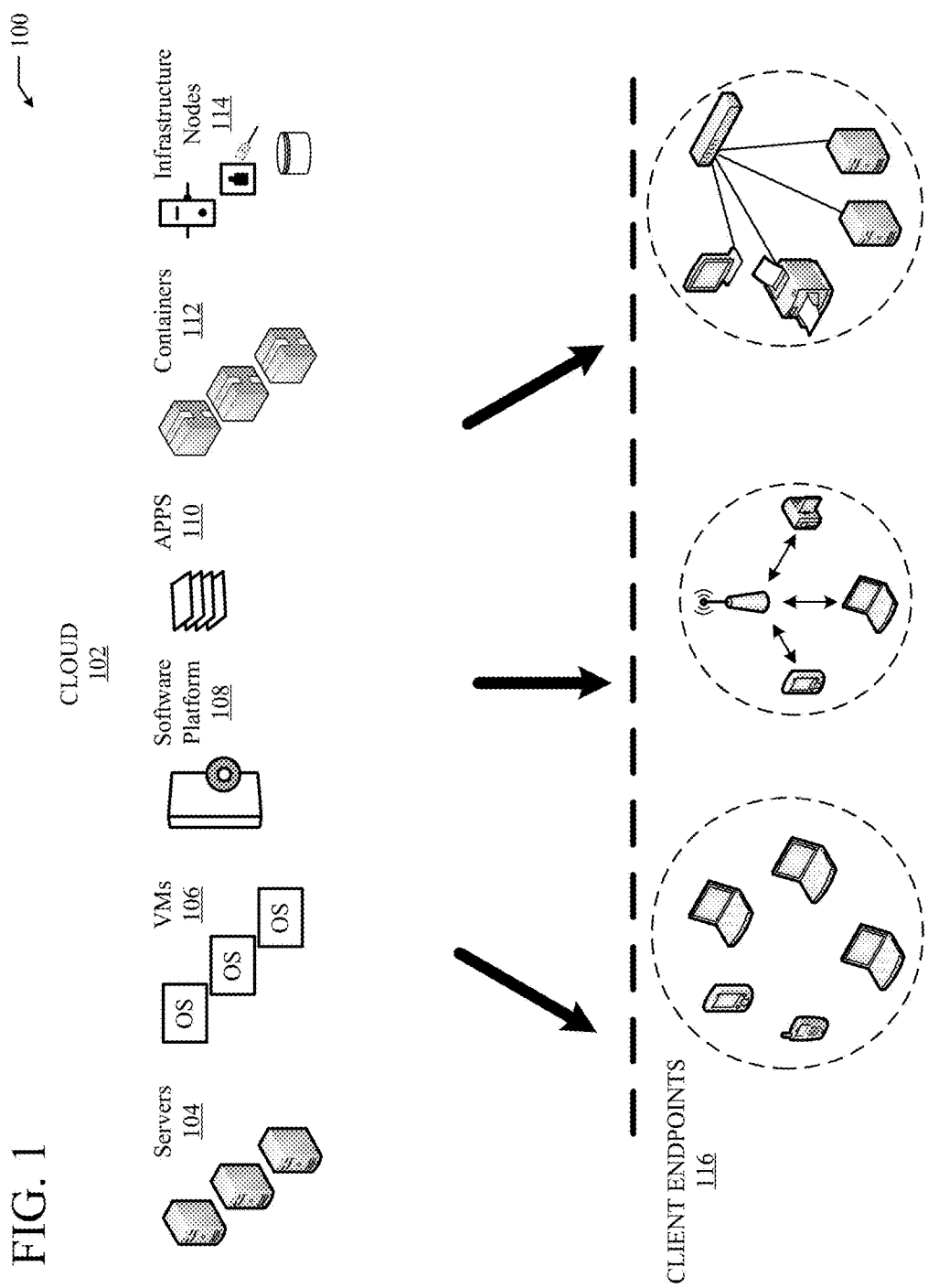
FIG. 1 is a system diagram of an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

OVERVIEW

A system, network device, method, and computer readable storage medium is disclosed for deployment of a distributed application on a computing environment. The deployment may include obtaining an initial solution model of service descriptions for deploying the distributed application from a database of an orchestrator system, the initial solution model comprising a list of a plurality of deployment policy identifiers, each deployment policy identifier corresponding to an operational decision for deployment of the distributed application on the computing environment and executing a policy application corresponding to a first deployment policy identifier of the list of the plurality of deployment policy identifiers. In general, the policy application may apply a first operation decision for deployment of the distributed application on the computing environment to generate a new solution model for deploying the distributed application on the computing environment and store the new solution model for deploying the distributed application in the database, the new solution model comprising a solution model identifier including the first deployment policy identifier. Following the execution of the policy application, the new solution model may be converted into a descriptor including service components utilized for running the distributed application on the computing environment.

EXAMPLE EMBODIMENTS

Aspects of the present disclosure involve systems and methods for compiling abstract application and associated service models into deployable descriptors under control of a series of policies, maintaining and enforcing dependencies between policies and applications/services, and deploying policies as regularly managed policy applications themselves. In particular, an orchestration system is described that includes one or more policy applications that are executed to apply policies to a deployable application or service in a computing environment. In general, the orchestration system operates to create one or more solution models for execution of an application on one or more computing environments (such as one or more cloud computing environments) based on a received request for deployment. The request for the application may include one or more specifications for deployment, including one or more policies. Such policies may include, but are not limited to, resource consumption considerations, security considerations, regulatory policies, and network considerations, among other policies. With the application deployment specifications and policies, the orchestration system creates one or more solution models that, when executed, deploys the application on the various selected computing environments.

In particular, the solution models generated by the orchestrator may include instructions that, when activated, are compiled to instruct the one or more computing environments how to deploy an application on the cloud environment(s). To apply the policy considerations, the orchestrator may execute one or more policy applications onto various iterations of a solution model of the distributed application. Such execution of policy applications may occur for newly created solution models or existing distributed applications on the computing environments.

In one particular implementation, policies may be applied to solution models of an intended distributed application or service in a pipeline or policy chain to produce intermediate solution models within the pipeline, with the output model of the last applied policy application equating to a descriptor executable by the orchestrator for the distribution of the application on the computing environment(s). Thus, a first policy is applied to the application through a first policy application executed by the orchestration system, followed by a second policy applied through a second policy application, and so on until each policy of the application is executed. The resulting application descriptor may then be executed by the orchestrator on the cloud environment(s) for implementation of the distributed application. In a similar manner, updates or other changes to a policy (based on monitoring of an existing distributed application) may also be implemented or applied to the distributed application. Upon completion of the various policy applications on the model solution for the distributed application, the distributed application may be deployed on the computing environment(s). In this manner, one or more policy applications may be executed by the orchestrator to apply the underlying deployment policies on the solution models of a distributed application or service in a cloud computing environment.

In yet another implementation, the various iterations of the solution model generated during the policy chain may be stored in a database of model solutions of the orchestrator. The iterations of the solution model may include a list of applied policies and to-be applied policies for direction in executing the policy applications on the solution models. Further, because the iterations of the solution model are stored, execution of one or more policy applications may occur on any of the solution models, thereby removing the need for a complete recompiling of the model solution for every change to the policies of the application. In this manner, a deployed application may be altered in response to a determined change to the computing environment faster and more efficiently. Also, since policy themselves are applications executed by the orchestrator, policies may be applied to policies to further improve the efficiency of the orchestrator system and underlying computing environments.

Beginning with the system of FIG. 1, a diagram of an example cloud computing architecture 100 is illustrated. The architecture can include a cloud computing environment 102. The cloud 102 may include one or more private clouds, public clouds, and/or hybrid clouds. Moreover, the cloud 102 may include any number and type of cloud elements 104-114, such as servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 may provide various cloud computing services via the cloud elements 104-114 to one or more clients 116 of the cloud environment. For example, the cloud environment 102 may provide software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), function as a service (FaaS), and other types of services such as desktop as a service (DaaS), information technology management as a service (ITaaS), managed software as a service (MSaaS), mobile backend as a service (MBaaS), etc.

Client endpoints 116 connect with the cloud 102 to obtain one or more specific services from the cloud 102. For example, the client endpoints 116 communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

Figure 2:
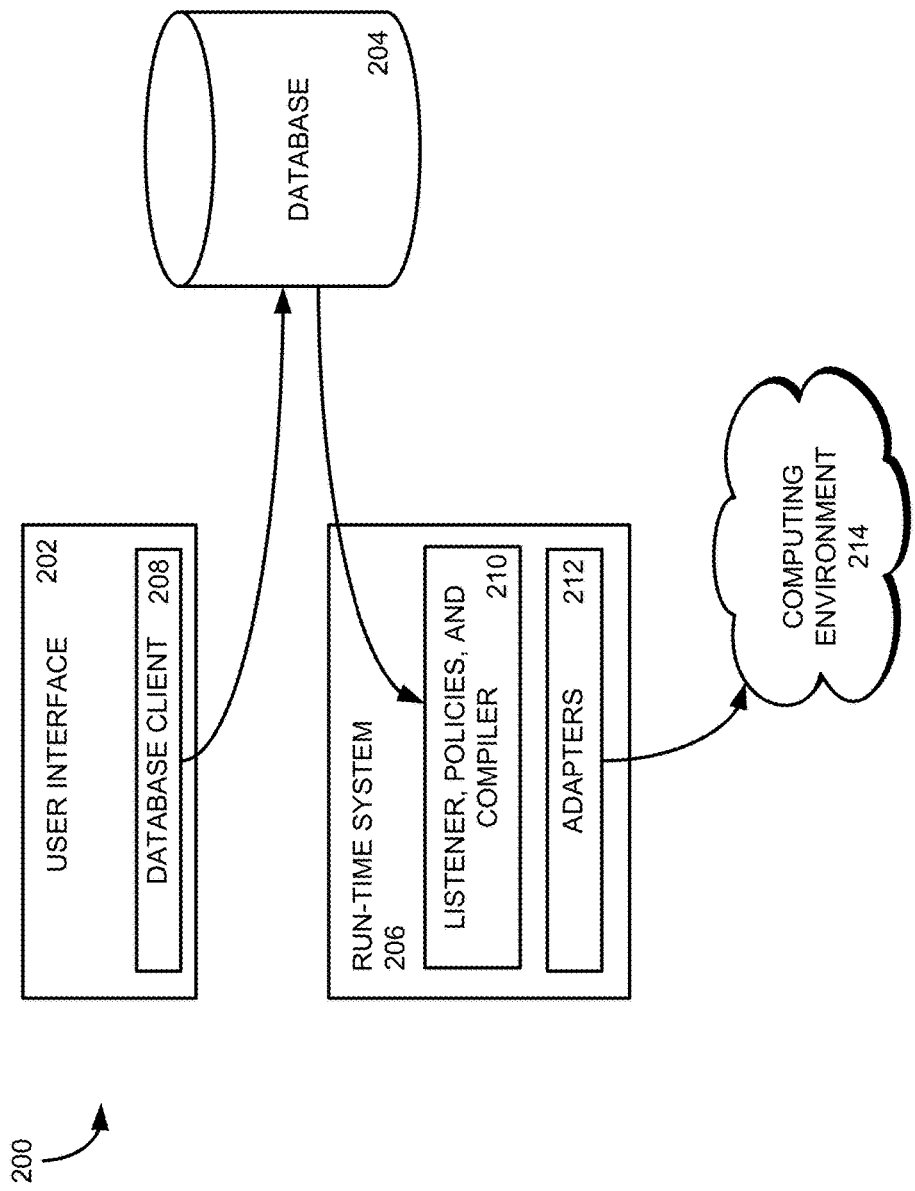
FIG. 2 is a system diagram for an orchestration system for deploying a distributed application on a computing environment.

To instantiate applications, services, virtual machines, and the like on the cloud environment 102, some environments may utilize an orchestration system to manage the deployment of such applications or services. For example, FIG. 2 is a system diagram for an orchestration system 200 for deploying a distributed application on a computing environment, such as a cloud environment 102 like that of FIG. 1. In general, the orchestrator 200 automatically selects services, resources, and environments for deployment of an application based on a request received at the orchestrator. Once selected, the orchestrator 200 may communicate with the cloud environment 100 to reserve one or more resources and deploy the application on the cloud.

In one implementation, the orchestrator 200 may include a user interface 202, a database 204, and a run-time application or system 206. For example, a management system associated with an enterprise network or an administrator of the network may utilize a computing device to access the user interface 202. Through the user interface 202 information concerning one or more distributed applications or services may be received and/or displayed. For example, a network administrator may access the user interface 202 to provide specifications or other instructions to install or instantiate an application or service on the cloud environment 214. The user interface 202 may also be used to post solution models describing distributed applications with the services (e.g., clouds and cloud-management systems) into the cloud environment 214. The user interface 202 further may provide active application/service feedback by representing application state managed by the database.

The user interface 202 communicates with a database 204 through a database client 208 executed by the user interface. In general, the database 204 stores any number and kind of data utilized by the orchestrator 200, such as service models, solution models, virtual function model, solution descriptors, and the like. In one embodiment, the database 204 operates as a service bus between the various components of the orchestrator 200 such that both the user interface 202 and the run-time system 206 are in communication with the database 204 to both provide information and retrieve stored information.

The orchestrator run-time system 206 is an executed application that generally applies service or application solution descriptors to the cloud environment 214. For example, the user interface 202 may store a solution model for deploying an application in the cloud environment 214. The solution model may be provided to the user interface from a management system in communication with the user interface 202 for the deployment of a particular application. Upon storage of the solution model in the database 204, the run-time system 206 is notified and compiles, utilizing a complier application 210, the model into descriptors ready for deployment. The run-time system 206 may also incorporate a series of adapters 212 that adapt solution descriptors to underlying (cloud) services 214 and associated management systems. Further still, the run-time system 206 may include one or more listening modules that store states in the database 204 associated with distributed applications, which may trigger re-application of one or more incorporated policies into the application, as explained in more detail below.

In general, a solution model represents a template of a distributed application or constituent service that is to be deployed by the orchestrator 200. Such a template describes, at a high level, the functions that are part of the application and/or service and how they are interconnected. In some instances solution models include an ordered list of policies that is to be applied to help define the descriptor based on the model. A descriptor is, in general, a data structure that describes precisely how the solution is to be deployed in the cloud environment 214 through interpretation by the adapters 218 of the run-time system 206.

In one implementation, each solution model of the system 200 may include a unique identifier (also referred to as a solution identifier), an ordered list of policies to be applied to complete the compilation (with each policy including unique identifier called policy identifier), an ordered list of executed policies, a desired completion state that signals if the solution needs to be compiled, activated or left alone, and a description of the distributed applications, i.e. the functions in the application, their parameters, and their interconnections. More or less information of the application may also be included in the solution model stored in the database 204.

As mentioned above, the run-time system 206 compiles application and associated descriptors from the solution models of the database 204. The descriptors list all application and associated service components that are utilized to make the applications run successfully on the cloud environment 214. For example, the descriptors list what cloud services and management systems are used, what input parameters are used for components and associated services, what networks and network parameters are used to operate the application and more. As such, the policies applied to the solution model during compiling may affect several aspects of the deployment of the application on the cloud.

In one implementation, the compiling of the solution model may be done by the run-time system 206 under control of one or more policies. In particular, the run-time system 206 may include one or more policy applications that are configured to apply a particular policy to a solution model stored in the database 204. Policies may include, but are not limited to, considerations such as:

Workload placement related policies. These policies assess what resources are available in the cloud environments 214, the cost of deployments (for compute, networking and storage) across various cloud services, and key-performance objectives (availability, reliability and performance) for the application and its constituent parts to refine the application model based on evaluated parameters. If an application is already active or deployed, such policies may refine the model using measured performance data.

Life-cycle management related policies. These policies consider the operational state of the application during compiling. If the application is under development, these are policies that may direct the compilation towards the use of public or virtual-private cloud resources and may include test networking and storage environments. On the other hand, when an application is deployed as part of a true live deployment, life-cycle management policies fold in operational parameters used for such live deployments and support functions for live upgrade of capacity, continuous delivery upgrades, updates to binaries and executables (i.e., software upgrades) and more.

Security policies. These policies craft appropriate networking and hosting environments for the applications through insertion of ciphering key material in application models, deploying firewalls and virtual-private networks between modeled end points, providing for pin-holes into firewalls, and prohibiting deployment of applications onto certain hosting facilities depending on the expected end use (e.g., to consider regional constraints).

Regulatory policies. Regulatory policies determine how applications can be deployed based on one or more regulations. For example, when managing financial applications that operate on and with end-customer (financial) data, locality of such data is likely regulated—there may be rules against exporting of such data across national borders. Similarly, if managed applications address region-blocked (media) data, computation and storage of that data may be hosted inside that region. Thus, such policies assume the (distributed) application/service model and are provided with a series of regulatory constraints.

Network policies. These policies manage network connectivity and generate virtual-private networks, establish bandwidth/latency aware network paths, segment routed networks, and more.

Recursive policies. These policies apply for dynamically instantiated cloud services stacked onto other cloud services, which can be based on other cloud services. This stacking is implemented by way of recursion such that when a model is compiled into its descriptor, a policy can dynamically generate and post a new cloud service model reflective of the stacked cloud service.

Application-specific policies. These are policies specifically associated with the applications that are compiled. These policies may be used to generate or create parameters and functions to establish service chaining, fully-qualified domain names and other IP parameters and/or other application-specific parameters.

Storage policies. For applications where locality of information resources is important (e.g., because these are voluminous, cannot leave particular location, or because it is prohibitively expensive to ship such content), storage policies may place applications close to content.

Multi-hierarchical user/tenant access policies. These are policies that describe user permissions (which clouds, resources, services and etc. are allowed for a particular user, what security policies should be enforced according to the groups of users and others).

The execution of the above mentioned policies, among other policies, may be executed by the run-time system 206 upon compiling of an application solution module stored in the database 204. In particular, policy applications (each associated with a particular policy to be applied to a distributed application) listen or are otherwise notified of a solution model stored on the database 204. When a policy application of the run-time system 206 detects a model it can process, it reads the model from the database 204, enforces its policies and returns the result back to the database for subsequent policy enforcement. In this manner, a policy chain or pipeline may be executed on the solution model for a distributed application by the run-time system 206. In general, a policy application can be any kind of program, written in any kind of programming language and using whatever platform to host the policy application. Exemplary, policy applications can be built as server-less Python applications, hosted on a platform-as-a-service.

Figure 3:
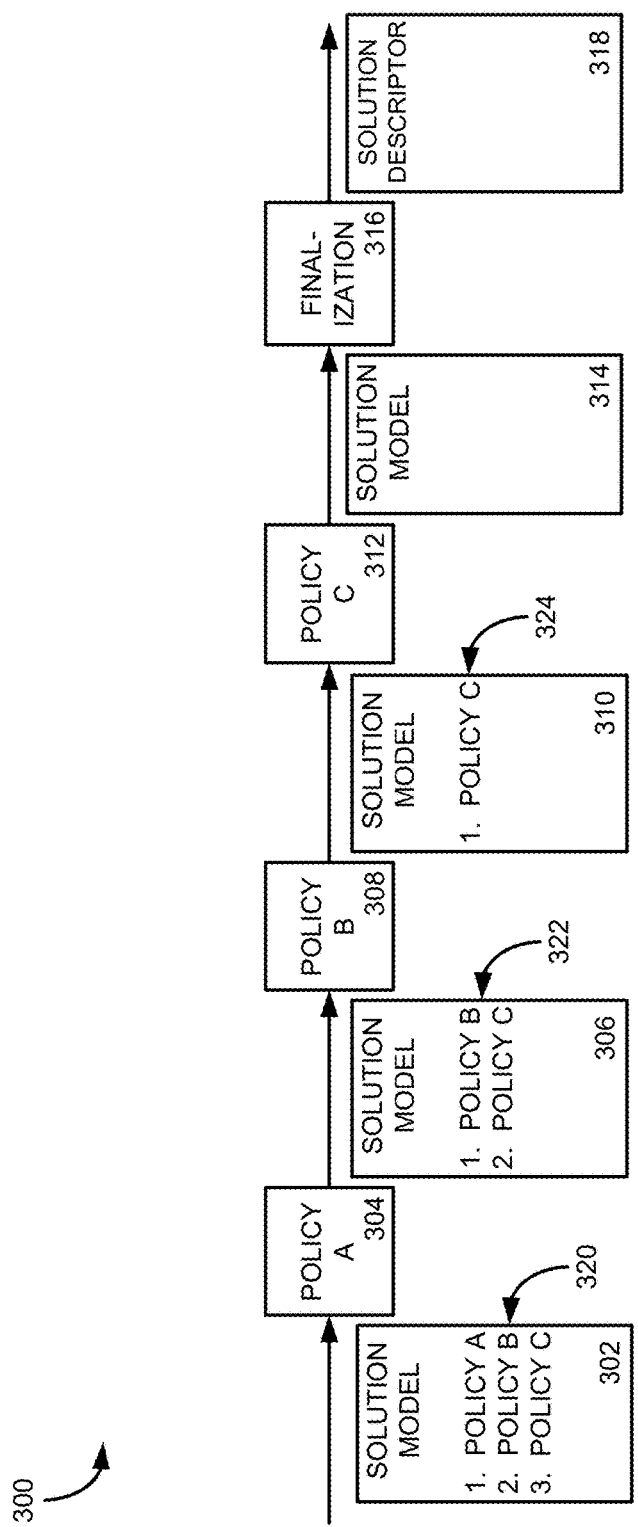
FIG. 3 is a diagram illustrating a compilation pipeline for applying policies to a distributed application solution model.

A compilation process executed by the run-time system 206 can be understood as a pipeline, or a policy chain, where the solution model is transformed by the policies while being translated into a descriptor. For example, FIG. 3 illustrates a compilation pipeline 300 for applying policies to a distributed application solution model. The compilation of a particular solution model for a distributed application flows from the left side of the diagram 300 to the right side, starting with a first solution model 302 and ending with a solution descriptor 318 that may be executed by the run-time system 206 to deploy the application associated with the model solution on the cloud environment 214.

In the particular example shown, three policies are to be applied to the solution model during compiling. In particular, solution model 302 includes a listing 320 of the policies to be applied. As discussed above, the policies may be any consideration undertaken by the orchestrator 200 when deploying an application or service in the cloud environment 214. At each step along the policy chain 300, a policy application takes as input a solution model and produces a different solution model as result of the policy application. For example, policy application A 304 receives solution model 302 as an input, applies policy A to the model, and outputs solution model 306. Similarly, policy application B 308 receives solution model 304 as an input, applies policy B to the model, and outputs solution model 310. This process continues until all of the policies listed in the policy list 320 are applied to the solution model. When all policies are applied, a finalization step 316 translates the resulting solution model 314 into solution descriptor 318. In some instances, the finalization step 316 may be considered a policy in its own right.

Figure 4:
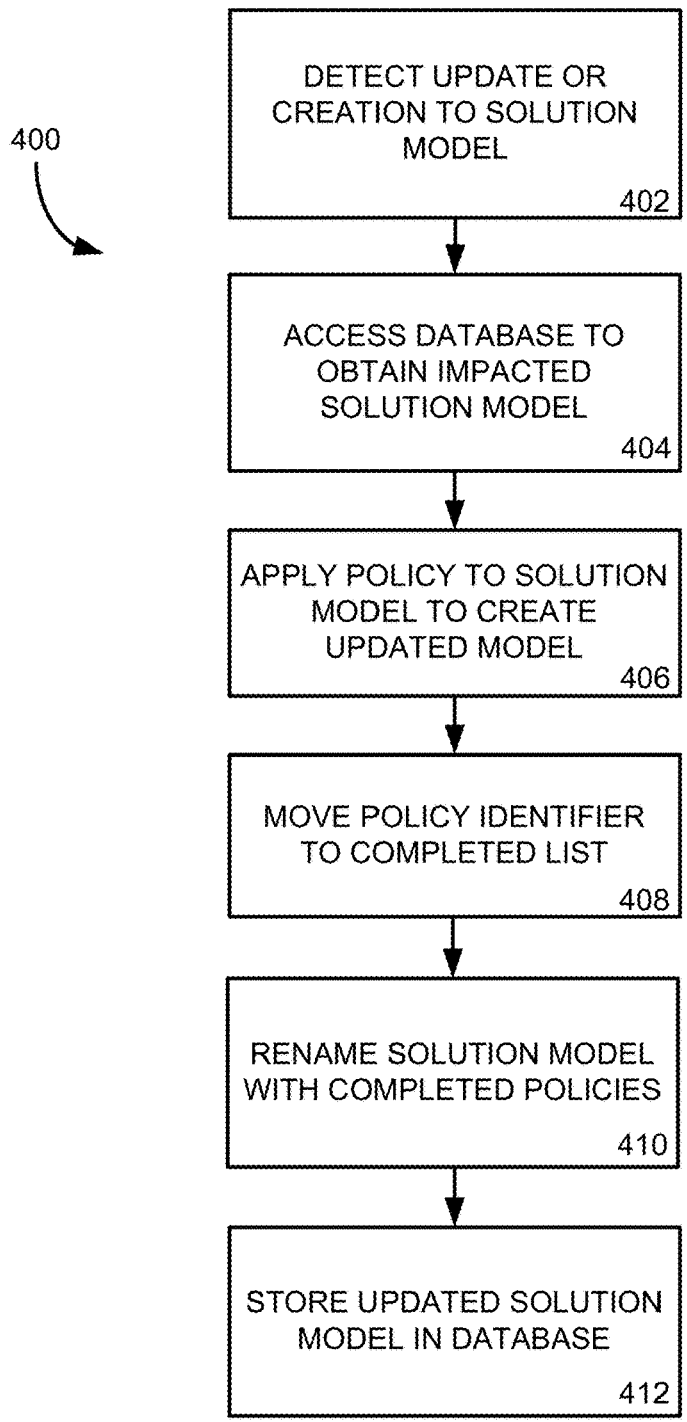
FIG. 4 is a flowchart of a method for executing a policy applications to apply policies to a distributed application model

At each step along the policy chain 300, a policy application is executed by the run-time system 206 to apply a policy to the solution model. FIG. 4 illustrates a flowchart of a method 400 for executing a policy application to apply one or more policies to a distributed application solution model. In other words, each of the policy applications in the policy chain 300 for compiling the model may perform the operations of the method 400 described in FIG. 4. In other embodiments, the operations may be performed by the run-time system 206 or any other component of the orchestrator 200.

Beginning in operation 402, the run-time system 206 or policy application detects a solution model stored in the database 204 of the orchestrator 200 for compiling. In one instance, the solution model may be a new solution model stored in the database 204 through the user interface 202 by an administrator or user of the orchestrator 200. The new solution model may describe a distributed application to be executed or instantiated on the cloud environment 214. In another instance, an existing or already instantiated application on the cloud 214 may be altered or a change in a policy may occur within the environment such that a new deployment of the application is needed. Further, the detection of the updated or new solution model in the database 204 may come from any source in the orchestrator 200. For example, the user interface 202 or the database 204 may notify the run-time system 206 that a new model is to be compiled. In another example, a listener module 210 of the run-time system 206 may detect a change in the policy of a particular application and notify the policy application to execute a policy change on the application as part of the compilation policy chain 300.

Upon detection of the solution model to be compiled, the run-time system 208 or policy application may access the database 204 to retrieve the solution model in operation 404. The retrieved solution model may be similar to solution model 302 of the compilation chain 300. As shown, the solution model 302 may include a list of policies 320 to be applied to the model during compiling, beginning with a first policy. In operation 406, the policy application applies the corresponding policy to the solution model, if the policy identity matches the policy of the policy application. For example, solution model 302 includes policy list 320 that begins by listing policy A. As mentioned above, the policy list 320 includes a listing of policies to be applied to the solution model. Thus, the run-time system 206 executes policy application A (element 304) to apply that particular policy to the solution model.

After execution of the policy defined by the policy application on the solution model, the policy application or run-time application 206 may move or update the list of policies to be applied 320 to indicate that the particular policy has been issued in operation 408. For example, a first solution model 302 illustrated in the compilation pipeline 300 of FIG. 3 includes a list of policies 320 to be applied to the solution model. After application of policy A 304, a new solution model 306 is generated that includes a list 322 of policies still to be applied. The list 322 in the new solution model 306 does not include Policy A 304 as that policy was previously applied. In some instances, the solution model includes both a list of policies to be applied and a list of policies that have been applied to the solution in the pipeline 300. Thus, in this operation, the orchestrator 200 may move the policy identification from a "to do" list to a "completed" list. In other instances, the orchestrator 200 may simply remove the policy identification from the "to do" list of policies.

In operation 410, the run-time system 206 may rename the solution model to indicate that a new solution model is output from the policy application and stored the new solution model in the database in operation 412. For example, the pipeline 300 of FIG. 3 indicates that policy application B 308 inputs solution model 306 to apply policy B into the solution. The output of the policy application 308 is a new solution model 310 that includes an updated list 324 of policies remaining to be applied to the solution model. The output solution model 310 may then be stored in the database 204 of the orchestrator system 200 for further use by the orchestrator (such as an input for policy application C 312). In one particular embodiment, the output solution model may be placed on a message bus for the orchestrator system 200 for storage in the database 204.

Through the method 400 discussed above, one or more policies may be executed into a solution model for a distributed application in one or more cloud computing environments. When a distributed application calls for several policies, a pipeline 300 of policy applications may be executed to apply the policies to the solution model stored in the database 204 of the orchestrator 200. Thus, policies may be applied to a distribution solution through independent applications listening and posting to the message bus, all cooperating by exchanging messages across the message bus to perform process models into descriptors for deployment in a computing environment.

Figure 5:
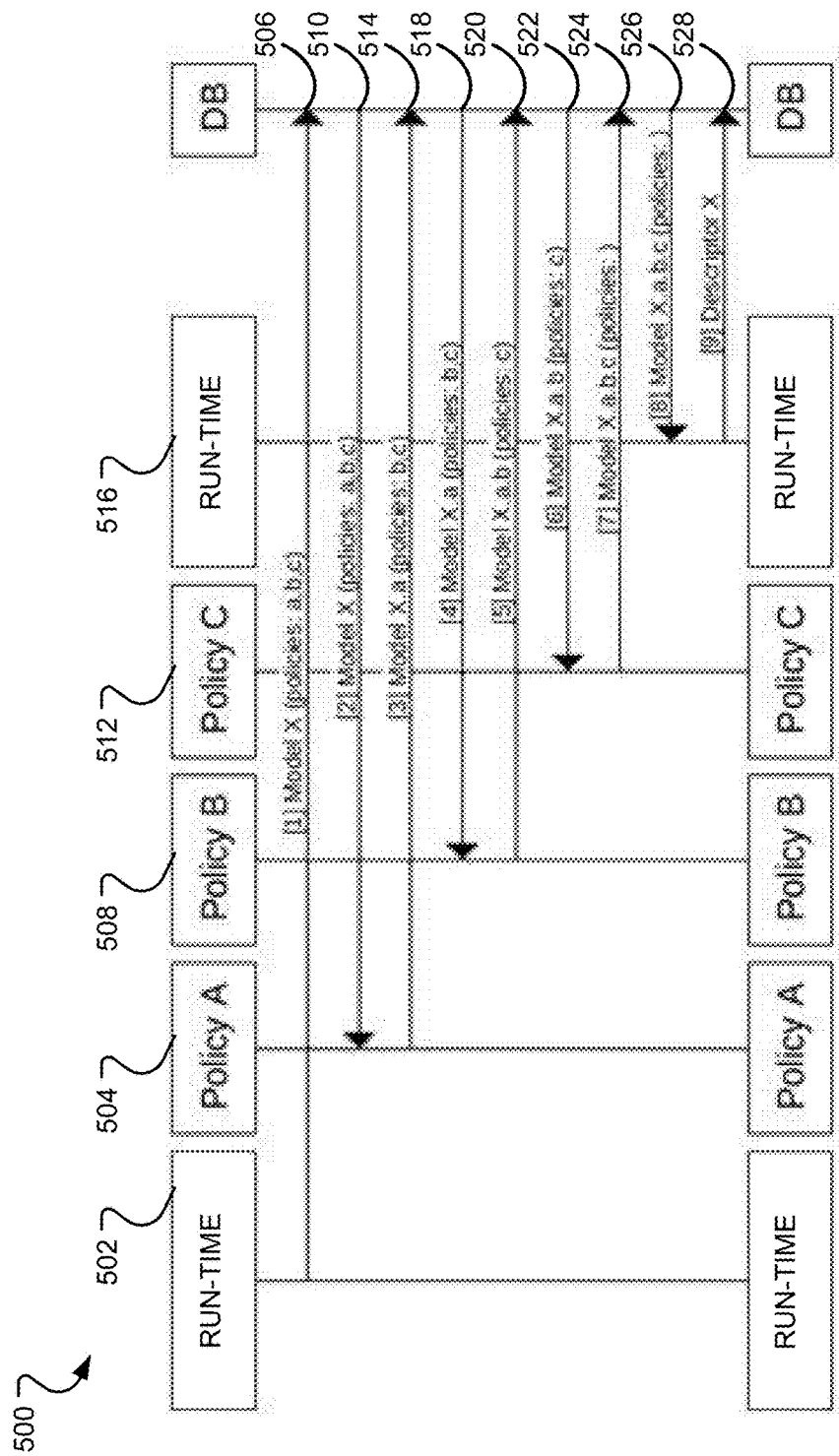
FIG. 5 is a diagram illustrating a call-flow for the application of a sequence of policies on a distributed application model.

Turning now to FIG. 5, diagram 500 is shown of a call-flow for the application of a sequence of policies on a distributed application model. In general, the call-flow is performed by components of the orchestrator system 200 discussed above. Through the call-flow 500, an original model created by an orchestrator architect contains an empty list of applied policies (with a list of policies to apply being stored or maintained by the solution models). While the model is processed by way of the various policy-apps, the data structures maintained (i.e., the model that is being compiled) lists which policies have been applied and which still need to be applied. When the last policy is applied, the output model contains an empty list of policies to be applied and the descriptor is generated.

More particularly, the run-time system 206 may operate as the overall manager of the compilation process, illustrated as pipeline 300 in FIG. 3. As such, the run-time system 206 (also illustrated as box 502 in FIG. 5) stores a solution model to the pipeline 300 in the database 204. This is illustrated in FIG. 5 as call 506 where model X (with policies: a, b, and c) are transmitted to and stored in the database 503. In one embodiment, model X is stored by putting the solution model on the message bus of the orchestrator 200. A particular naming scheme for solution model IDs may be used as X.Y, where X is the ID of the input solution model and Y is the policy ID applied. This convention makes easy for the policy to identify if an output model already exists and update it as opposed to creating a new one for each change to a descriptor.

Upon storage of the initial solution model in the database 503, the run-time system 502 is activated to begin the compilation process. In particular, the run-time system 502 notes that the solution model is to include policies a, b, and c (as noted in a policy list to be completed stored as part of the model). In response, the run-time system 506 executes policy application A 504. As described above, policy applications may perform several operations to apply a policy to a model. For example, policy application A 504 calls model X from the database 503 in call 510 and applies policy A to the retrieved model. Once the policy is applied, policy application A 504 alters the list of policies to be applied (i.e., removing policy a from the to-do list) and, in one embodiment, changes the name of the solution model to reflect the applied policy. For example, policy application A 504 may create a new solution model after applying policy A and store that model in the database 503 (call 514) as Model X.a.

Once Model X.a is stored, run-time system 502 may analyze the stored model to determine that the next policy to apply is policy b (as noted in the list of policy IDs to be applied). In response, run-time system 502 executes policy application B 508 which in turn obtain Model X.a from the database 503 (call 518) and applies policy b to the model. Similar to above, policy application B 508 updates the policy ID list in the model to remove policy b (as policy b is now applied to the solution model) and generate a new model output that is renamed, such as Model X.a.b. This new model is then stored in the database 503 in call 520. A similar method is conducted for policy c (executing policy application C 516, obtaining model X.a.b in call 522, applying policy c to generate a new solution model, and storing new model X.a.b.c in the database 503 in call 524).

Once all policies listed in the model are applied, the run-time system 516 obtains the resulting model (X.a.b.c) from the database 503 and generates a descriptor (such as descriptor X) for deploying the solution onto the computing environment. The descriptor includes all of the applied policies and may be stored in the database 503 in call 528. Once stored, the descriptor may be deployed onto the computing environment 214 by the run-time system 206 for use by a user of the orchestrator system 200.

Note that all intermediate models of the compilation call-flow or pipeline are retained in the database 503 and can be used for debugging purposes. This may aid in reducing the time needed for model recompilation in case some intermediate policies have been changed. If, for example, policy b was changed by a user or by an event from a deployment feedback, then policy b only needs to find and process intermediate models already precompiled by policy a. The approach increases the overall time efficiency of policy application. The use of intermediately stored solution models is discussed in more detail below.

Figure 6:
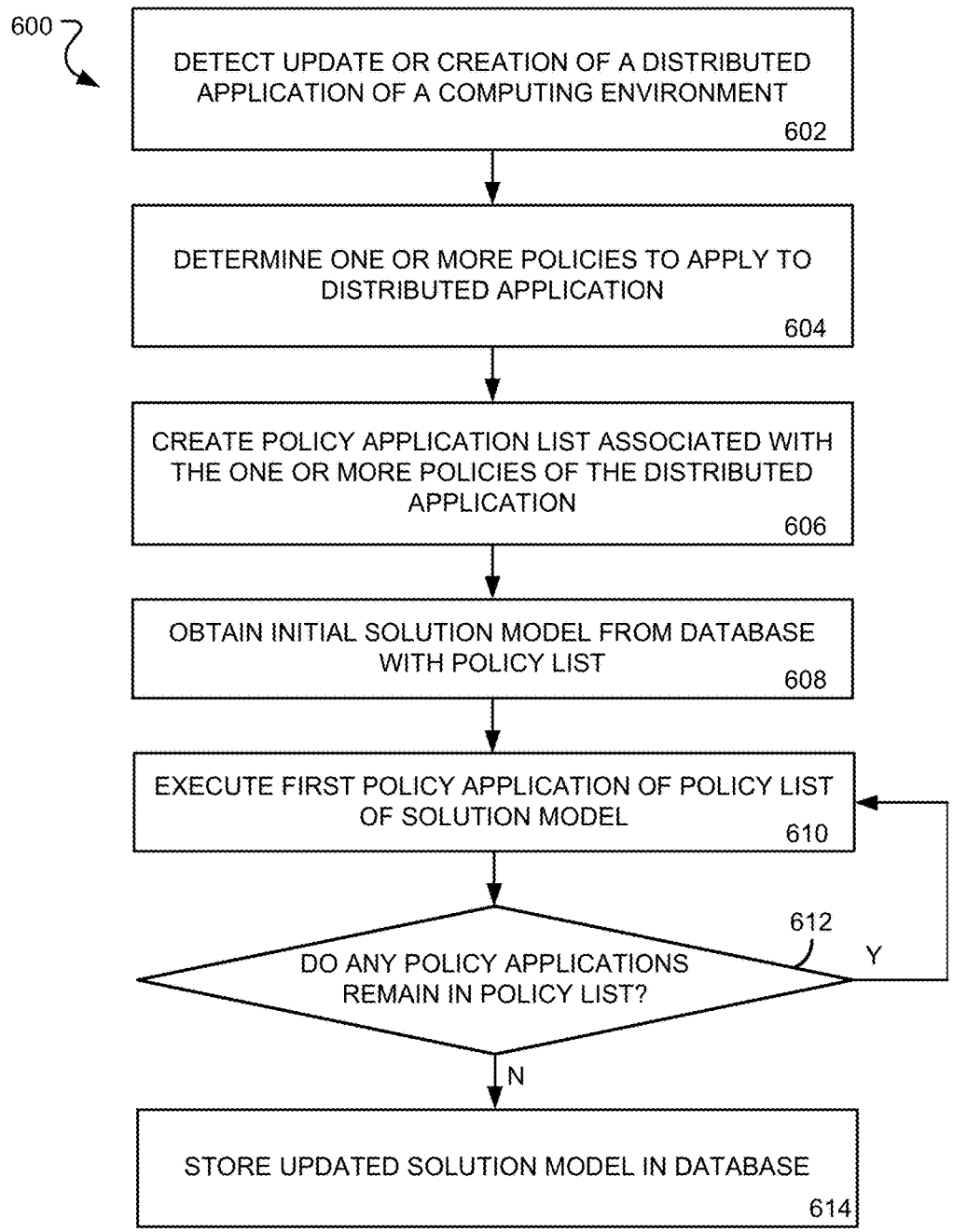
FIG. 6 is a flowchart of a method for an orchestration system for updating a solution model of a distributed application with one or more policies

As illustrated in the call-flow diagram 500 of FIG. 5, the run-time system 502 may execute one or more policy applications to apply policies to a solution model for deployment of a distributed application or service in a computing environment such as a cloud. FIG. 6 is a flowchart of a method 600 for updating a solution model of a distributed application with one or more policies. In general, the operations of the method 600 may be performed by one or more components of the orchestration system 200. The operations of the method 600 describe the call-flow diagram discussed above.

Beginning in operation 602, the run-time system 502 of the orchestrator detects an update or creation of a solution model stored in the database 503. In one embodiment, a user interface 202 of the orchestrator (or other component) may store a solution model for a distributed application or service in the database 503. In another embodiment, the run-time system 206 provides an indication of an update to a deployed application or service. For example, application descriptors and the policies that helped create those descriptors may be inter-related. Thus, when an application and/or service descriptor that depends on a particular policy gets updated, the application/service may be re-evaluated with a new version of a specific policy. Upon re-evaluation, a recompilation of the solution model may be triggered and performed. Further, as all intermediate models of the compilation call-flow or pipeline are retained in the database 503 and can be used for debugging purposes, this re-compilation may be accomplished in less time than when the system starts with a base solution model.

In operation 604, the run-time system 506 may determine which policies are intended for the solution model and, in some instances, create a policy application list for the solution model in operation 606. For example, the solution model may include a list of policies to be applied as part of the solution model. In another example, the run-time system 502 or other orchestration component may obtain the specifications of the application and determine the policies to be applied to the distributed application or service in response to the specifications. Regardless of how the types and numbers of policies for the model solution are determined, a list of policy IDs are created and stored in the solution model for use in the compilation pipeline for the particular model.

In operation 608, the run-time system 502 obtains the initial solution model from the database 503, including the list of policies to be applied to the model. In operation 610, the run-time system executes a policy application that corresponds to the first policy in the list of policy IDs for the model. As discussed above, the execution of the policy application includes the retrieval of the model from the database 503, the application of the policy onto the model, an updating of the policy list to remove the policy ID for the applied policy, a renaming of the output model to possibly include a policy ID of the applied policy, and storing the updated solution model in the database. Other or fewer operations may be performed during the execution of the policy application.

In operation 612, the run-time system 502 may determine if more policies in the list of policies remain. If yes, the method 600 returns to operation 610 to execute the top listed policy ID application as described to apply additional policies to the solution model. If no policies remain in the "to-do" policy list, the run-time system 506 may continue to operation 614 where the final solution model is stored in the database 503 for conversion into a descriptor for deploying the application or service in the computing environment.

Through the systems and methods describe above, several advantages in deploying a distributed application or service may be realized. For example, the use of the policy applications and compilation pipeline may allow for automatic recompilation of a solution upon a change to a record or policy associated with the distributed application. In particular, some policies may use the content of service records, i.e., records created by the orchestrator 200 that lists the state of the application or service, from the same or different solutions, as inputs for policy enforcement. Examples of such policies are workload placement policies, which uses the status of a given cloud service to determine placement, load-balancing policies that may use the state of an application to dimension certain aspects of the solution, or other policies. Service records may be dynamic such that orchestrators 200 can freely update them, resulting in the reapplication of policies to solution models of the database 204 upon service record changes, even if models themselves remain unchanged.

Similar to changes of service records, policies and policy applications themselves may change as well. Given that policies are implemented as applications, life-cycle event changes applied on the policy application may lead to a new version of the policy application being generated. When such changes occur, a re-evaluation of dependent solution models may be performed to apply the changes to the policy or policy applications to the solution models created and stored in the database 204.

To track dependencies between service records, policies and models, each policy applied to a solution model may insert in the processed model a list of service records that have been used as inputs and its own identification, which appears as a list of applied policies as discussed above. The orchestrator run-time application 206 may monitor for service record and policy application changes and, upon detection of a change, select all solution models stored in the database 204 that includes a dependency to the updated service records and/or policy application. This may trigger a recompilation of reach of the retrieved solution models to apply the changed service record or policy application to the solution models. Further, this guarantees that a record or policy application change activates all the impacted compilation pipelines only once. Given that policy applications themselves may depend on other policy applications, a cascade of recompilation and reconfiguration may be triggered when updating policies and/or policy applications.

One example of the updated service record or policy is now discussed with reference to the call flow 400 of FIG. 4 for the compilation pipeline 300 of FIG. 3. In particular, assume that policy B 508 and policy C 512 used service record Y as an input. During compilation, and more particularly during the execution of policy B application 508 and policy C application 512 by the run-time system 206, a reference to service record Y is included respectively in Model X.a.b and X.a.b.c. When service record Y is updated by the cloud computing environment, run-time service 206 may detect the update, determine that model X includes the service record Y that is updated, retrieves the original model X from the database 204, and updates the solution model revision, which in turn triggers a full recompilation of solution model X. In some instances, partial recompilation is possible as well by retrieving and updated only those solution models that include policies dependent on the service record. For example, run-time service 206 may obtain and update Model X.a.b and Model X.a.b.c as X.a is not impacted by a change to service record Y.

In still another implementation, the orchestrator 200 may allow a policy to indicate in the output solution model not only the service records it depends on, but also a set of constraints that defines which changes in the records should trigger a recompilation. For example, a policy may indicate that it depends on service record Y and that a recompilation is needed only if a specific operational value in that service record goes above a given threshold. The run-time system 206 then evaluates the constraints and triggers a recompilation if the constraints are met.

Another advantage gained through the systems and methods described above include the separation of application definitions from a policy application. In particular, while a solution model describes what a distributed application looks like, the list of policies to apply determines how such a solution model is to be deployed on a computing environment. The same solution model might be deployed in different ways in different environments (private, public etc.) or in different phases (test, development, production, etc.), such that these components may be maintained separately. In one implementation, model inheritance of the system and methods above may be exploited to provide this separation.

For example, each solution model of the system 200 can extend to another solution model and (among other things) can add policies to be applied. One approach is to have one base solution model that contains only the application descriptions and no policies to be applied. A set of derived solution models may also be generated that extend the first solution model by adding specific policies to apply in the deployment of the application. For example, a solution model A can define a 4k media processing pipeline, while extended solution models B and C can extend A and augment it with a policy that would deploy the distributed application in a testing environment and another that would deploy the distributed application in a production environment, respectively. While the desired state of solution model A can be deemed "inactive", solutions B and C can be activated independently as needed for the deployment of the application. IN this manner, we have a tree of models where each leaf is represented by a unique set of policies.

Figure 7:
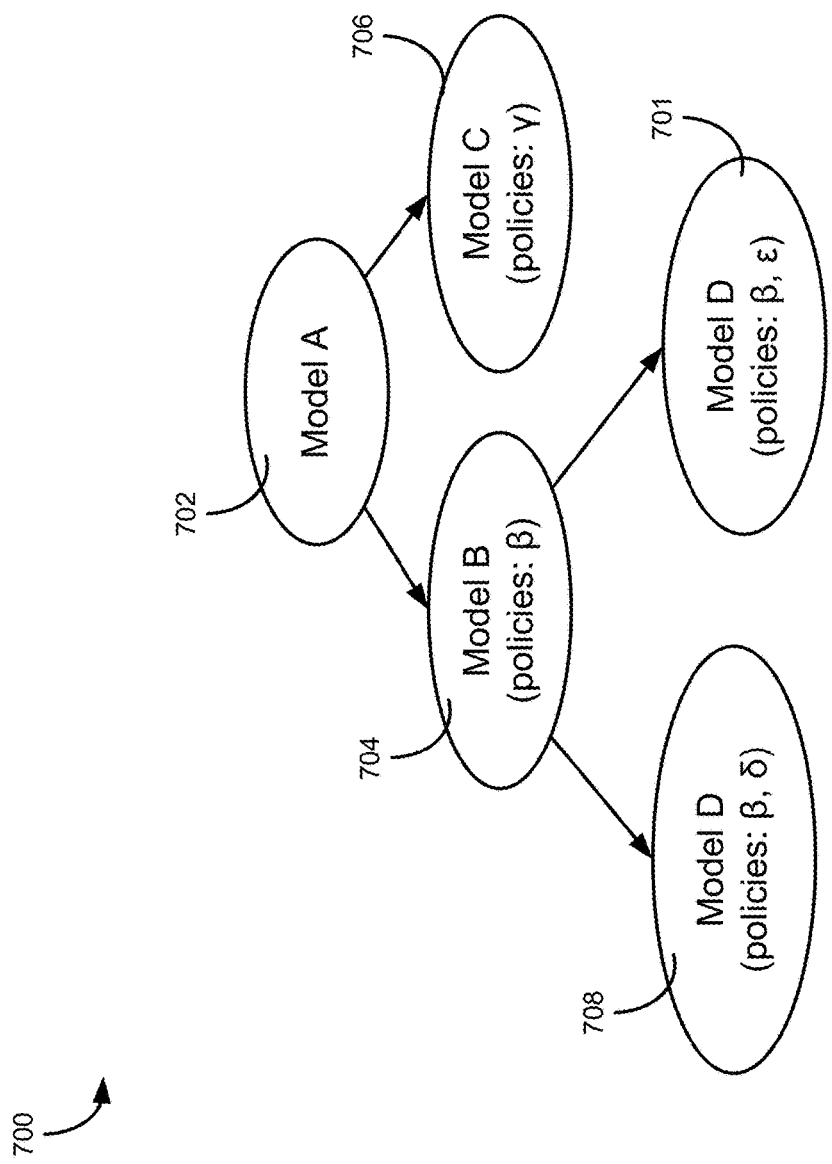
FIG. 7 is a tree diagram illustrating collection of solution models with varying policies applied.

FIG. 7 illustrates a tree diagram 700 of a collection of solution models with varying policies applied in a manner described above. As shown, the tree diagram includes a root node 702 for solution model A. As described, this solution model may be inert or inactive as a solution model. However, a first policy β may be added to Model A 702 to create an extended Model B 704 and a second policy γ may be added to Model A to create an extended Model C 706. In one implementation, policy β may represent an application deployment in a testing environment and policy γ may represent an application deployment in a production environment. It should be appreciated that the policies included in the tree diagram 700 may be any policies described above for deploying an application in a computing environment. Solution model B 704 may be further extended to include policy δ to create Model D 708 and policy £ to create Model E 710. In one particular example, policy δ may be a security policy while policy £ may be a regulatory policy, although any policy may be represented in the tree diagram 700.

Through the base and derived solution models, the efficiency of the creation or updating of a deployed application in a computing environment may be improved. In particular, rather than recompiling a solution model in response to an update to a policy (or the addition of a new policy to a distributed application), the orchestrator 200 may obtain an intermediate solution model that includes the other called-for policies that are not updated or effected and recompile the intermediate solution model with the updated policy. In other words, if any of intermediate policies change, it is only required to recompile a respective subtree instead of starting with the base model solution. In this manner, the time and resources consumed to recompile a solution model may be reduced over previous compiling systems.

Also, as described above, each policy may be instantiated in the orchestrator 200 as an application itself for execution. Thus, each policy application is an application in its own right and is therefore modelled by a function running in a solution model. Such a function may define the API of the policy, i.e. the configuration elements that such a policy accepts. When a model calls for a policy to be applied, it indicates the policy identity in the list of policies to be applied. That policy identity refers to the model and the function that implements the corresponding policy application. When a model is to be compiled, then it is orchestrator's responsibility to ensure that all the policy applications are active.

In general, policy applications are only active during the application compilation procedures. These application instances can be garbage collected when they have not been used for a while. Moreover, policy applications are ideally implemented as serverless functions, but deployment forms available to typical orchestrator 200 applications apply to policy applications as well.

Figure 8:
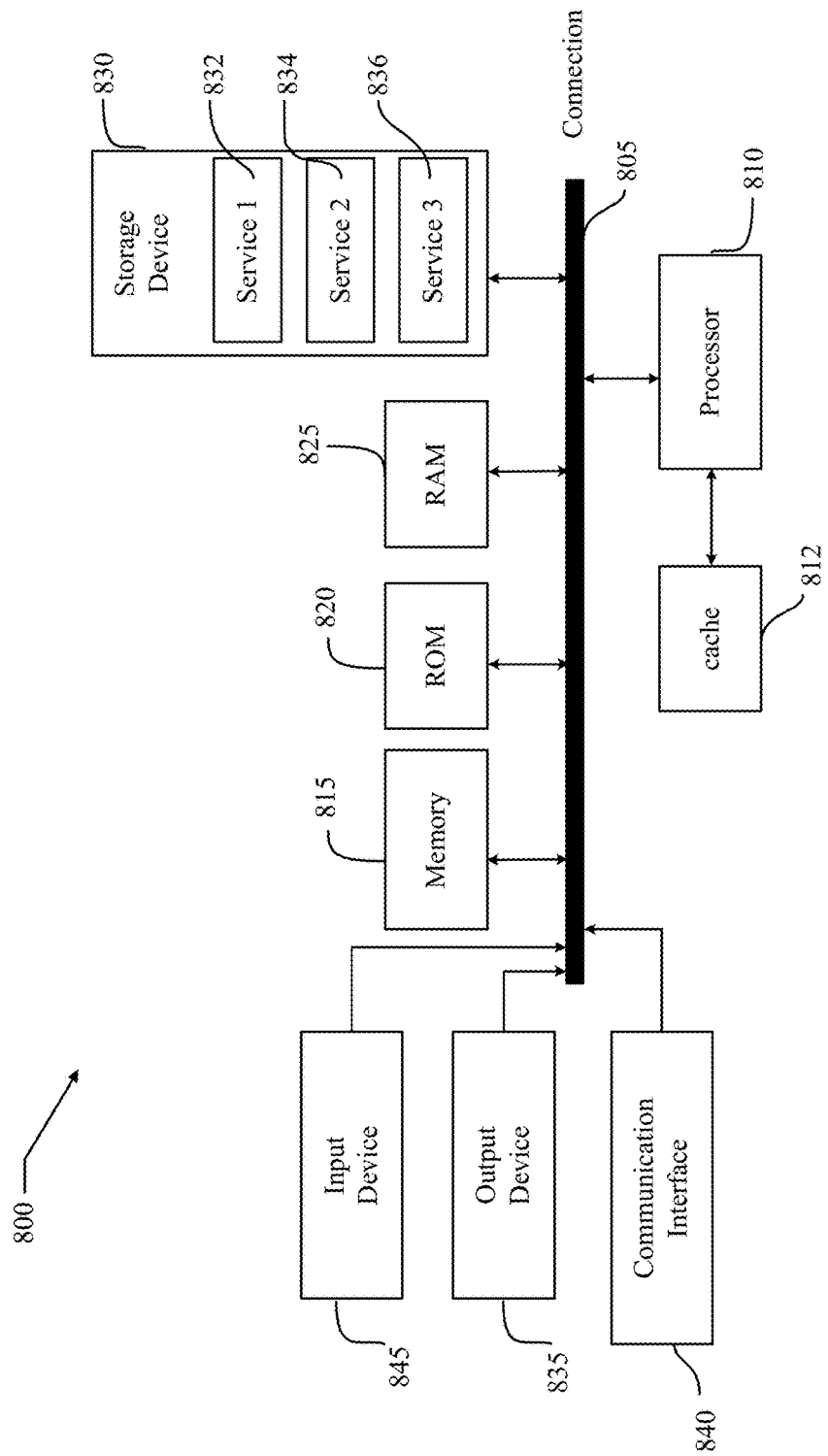
FIG. 8 shows an example system embodiment.

FIG. 8 shows an example of computing system 800 in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple datacenters, a peer network, etc. In some embodiments, one or more of the described system components represents many such components, each performing some or all of the function for which the component is described. In some embodiments, the components can be physical or virtual devices.

Example system 800 includes at least one processing unit (CPU or processor) 810 and connection 805 that couples various system components, including system memory 815, such as read only memory (ROM) 820 and random access memory (RAM) 825, to processor 810. Computing system 800 can include a cache of high-speed memory connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a portable device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method for deployment of a distributed application on a computing environment, the method comprising:
    obtaining an initial solution model of service descriptions for deploying the distributed application from a database of an orchestrator system, the initial solution model comprising a list of a plurality of deployment policy identifiers, each deployment policy identifier corresponding to an operational decision for deployment of the distributed application on the computing environment;
    executing a policy application corresponding to a first deployment policy identifier of the list of the plurality of deployment policy identifiers, the policy application configured to:
        apply a first operation decision for deployment of the distributed application on the computing environment to generate a new solution model for deploying the distributed application on the computing environment;
        store the new solution model for deploying the distributed application in the database, the new solution model comprising a solution model identifier including the first deployment policy identifier; and
        convert the new solution model into a descriptor including service components utilized for running the distributed application on the computing environment.

2. The method of claim 1 wherein the policy application is further, upon execution, configured to:
    remove the first deployment policy identifier from the list of the plurality of deployment policy identifiers.

3. The method of claim 2 wherein the new solution model for deploying the distributed application further comprises a list of applied policy identifiers for the distributed application and the policy application is further, upon execution, configured to:
    add the first deployment policy identifier to the list of applied policy identifiers for the distributed application.

4. The method of claim 3 wherein the policy application is further, upon execution, configured to:
    generate a storage identifier for the new solution model comprising at least the list of applied policy identifiers for the distributed application.

5. The method of claim 3 further comprising:
    receiving an indication of an update to a policy included in the list of applied policy identifiers for the distributed application;

obtaining the new solution model from the database; and executing a policy application corresponding to the update to the updated policy included in the list of applied policy identifiers to generate an updated solution model.

6. The method of claim 1 further comprising:

storing a service record reference in the new solution model upon execution of the policy application utilizing a service record for a distributed application associated with the service record reference;

receiving an indication of an update to the service record for the distributed application;

identifying the service record reference stored in the new solution model;

executing the policy application on the new solution model based on the indication of the update to the service record; and re-converting the new solution model into a new descriptor for running the distributed application on the computing environment.

7. The method of claim 1 further comprising:

modeling the policy application as a distributed application;

compiling the policy application into a policy descriptor;

receiving an indication of an update to the policy descriptor of the policy application; and executing the policy application corresponding to the update to the policy descriptor on each solution model stored in the database that includes the first deployment policy identifier.

8. The method of claim 1 further comprising:

receiving an indication of an update to a solution model through a user interface;

obtaining the new solution model from the database; and re-converting the new solution model into a new descriptor for running the distributed application on the computing environment based on the update to the solution model.

9. The method of claim 1 further comprising:

executing a second policy application on the initial solution model, the second policy application configured to:

apply a second operation decision for deployment of the distributed application on the computing environment to generate an extended solution model for deploying the distributed application on the computing environment; and store the extended solution model for deploying the distributed application in the database, the extended solution model different than the new solution model.

10. A system for managing a computing environment, the system comprising:

one or more processors;

memory including instructions that, when executed by the one or more processors, cause the system to perform operations comprising:

receiving, from a database of an orchestrator, an initial solution model of service descriptions for deploying a distributed application on the computing environment, the initial solution model comprising a list of a plurality of deployment policy identifiers each corresponding to an operational decision for deployment of the distributed application on the computing environment;

executing, by the orchestrator, a policy application corresponding to a first deployment policy identifier of the list of the plurality of deployment policy identifiers, wherein executing the policy application further causes the system to perform additional operations comprising:

applying a first operation decision for deployment of the distributed application on the computing environment to generate a new solution model for deploying the distributed application on the computing environment;

transmitting the new solution model to the database for storing, the new solution model comprising a solution model identifier including the first deployment policy identifier; and converting the new solution model into a descriptor including service components utilized for running the distributed application on the computing environment.

11. The system of claim 10 wherein the policy application further removes the first deployment policy identifier from the list of the plurality of deployment policy identifiers.

12. The system of claim 11 wherein the new solution model for deploying the distributed application further comprises a list of applied policy identifiers for the distributed application and the policy application further adds the first deployment policy identifier to the list of applied policy identifiers for the distributed application.

13. The system of claim 12 wherein the policy application further generates a storage identifier for the new solution model comprising at least the list of applied policy identifiers for the distributed application.

14. The system of claim 12 wherein the orchestrator further receives an indication of an update to a policy included in the list of applied policy identifiers for the distributed application and executes a policy application corresponding to the update to the policy included in the list of applied policy identifiers to generate an updated solution model.

15. The system of claim 10 wherein the orchestrator further stores a service record reference in the new solution model upon execution of the policy application utilizing a service record for a distributed application associated with the service record reference, receives an indication of an update to the service record for the distributed application, and executes the policy application on the new solution model based on the indication of the update to the service record.

16. The system of claim 10 wherein the operational decision for deployment of the distributed application on the computing environment comprises distribution of at least one security policy in the computing environment.

17. The system of claim 10 wherein the operational decision for deployment of the distributed application on the computing environment comprises distribution of at least one network deployment policy in the computing environment.

18. An orchestrator of a cloud computing environment, the orchestrator comprising:

a processing device; and a computer-readable medium connected to the processing device configured to store information and instructions that, when executed by the processing device, performs operations comprising:

obtaining an initial solution model of service descriptions for deploying a distributed application from a database in communication with the orchestrator, the initial solution model comprising a list of a plurality of deployment policy identifiers, each deployment policy identifier corresponding to an operational decision for deployment of the distributed application on the cloud computing environment;

executing a policy application corresponding to a first deployment policy identifier of the list of the plurality of deployment policy identifiers, the policy application configured to:

apply a first operation decision for deployment of the distributed application on the cloud computing environment to generate a new solution model for deploying the distributed application;

store the new solution model for deploying the distributed application in the database, the new solution model comprising a solution model identifier including the first deployment policy identifier; and convert the new solution model into a descriptor including service components utilized for running the distributed application on the cloud computing environment.

19. The orchestrator of claim 18 wherein the policy application is further, upon execution, configured to:

remove the first deployment policy identifier from the list of the plurality of deployment policy identifiers.

20. The orchestrator of claim 19 wherein the new solution model for deploying the distributed application further comprises a list of applied policy identifiers for the distributed application and the policy application is further, upon execution, configured to:

add the first deployment policy identifier to the list of applied policy identifiers for the distributed application.

* * * * *